Oct. 8, 1957  E. P. BULLARD III  2,808,737
VARIABLE-SPEED TRANSMISSION AND METHOD OF OPERATION
Filed April 1, 1952  4 Sheets-Sheet 1

INVENTOR
EDWARD P. BULLARD III
BY
ATTORNEY

United States Patent Office 2,808,737
Patented Oct. 8, 1957

2,808,737

VARIABLE-SPEED TRANSMISSION AND METHOD OF OPERATION

Edward P. Bullard III, Wethersfield, Conn., assignor to The Bullard Company, a corporation of Connecticut Application April 1, 1952, Serial No. 279,717

22 Claims. (Cl. 74—687)

This invention relates to variable-speed transmissions and particularly to that type of variable-speed transmissions that employ epicyclic gear trains in combination with variable-speed mechanism.

The primary function of any epicyclic system when used for transmitting power is to provide a different output speed from the input speed, and simultaneously to change the output torque inversely with respect to the speed ratio. Assuming an efficiency of 100%, such relation can be expressed in the following equation: $S_i/S_o = T_o/T_i$, in which $S_i$ is the input speed, $S_o$ is the output speed, $T_i$ is the input torque and $T_o$ is the output torque.

All epicyclic transmissions include a reactor which when held against rotation produces, with a given input speed, a "base" output speed that depends upon the gearing ratio of the epicyclic train. Speeds of the output shaft below the so-called "base" output speed can be effected by permitting rotation of the reactor; and output speeds above said "base" speed can be effected by causing the reactor to rotate in a direction opposite to that which it rotates for output speeds below said "base" speed. Accordingly, any force that varies the reactor speed to provide output speeds below "base" speed provides power flowing from the reactor; and any force that varies the reactor speed to provide output speeds above "base" speed provides power flowing to the reactor.

An efficient transmission must at all speeds, except near zero, be capable of transmitting substantially the full power supplied to the input shaft. In order to satisfy the above torque-speed equation, it is evident that the torque developed by the output shaft must differ from that which would be developed at the "base" speed due to the gear ratio of the epicyclic train alone. Specifically, it is evident that at output speeds below "base" speed, output torque must be higher, and conversely, at output speeds above "base" speed, output torque must be lower than that supplied by the epicyclic gear ratio alone at "base" speed. For example (Fig. 11), with an epicyclic train having a gear reduction ratio of 3:1, if the input speed is 1200 R. P. M. and the input torque is 1000 inch pounds, the "base" output speed and corresponding torque are 400 R. P. M. and 3000 inch pounds, respectively. If, however, the required transmission output speed were 200 R. P. M., then it would be necessary to produce 6000 inch pounds of torque on the output shaft to transmit all of the power supplied to the input shaft. Again, if the required output speed were 800 R. P. M., then the required output torque would be 1500 inch pounds. It is therefore obvious that auxiliary means must be employed to produce the necessary variations in speed and torque at the output shaft on each side of "base" speed in order to deliver therefrom substantially all the power that is supplied to the input shaft.

Prior-known transmissions of the type to which the principles of this invention relate, vary the reactor speed to secure desired output speed and torque characteristics by connecting one end of a variable-speed system to either the input or the output of the epicyclic gear train, and connecting the other end of said variable-speed system to the reactor. This arrangement is satisfactory when the one end of the variable-speed transmission is connected to the output of the epicyclic system during output shaft speed below "base" speed (i. e. power flowing from the reactor), and to the input during output shaft speed above "base" speed (i. e. power flowing to the reactor). Should, however, such connections be reversed, namely, with the one end of the variable-speed system connected to the input of the epicyclic gear train during output shaft speed below "base" speed (i. e. power flowing from the reactor), or to the output shaft during output shaft speed above "base" speed (i. e. power flowing to the reactor), then a condition commonly referred to as circulating or regenerative power will occur which may result in a loss of efficiency. Expressed otherwise, when this flow of power from the reactor is returned to the transmission at a point nearer the prime mover than the reactor; and when the flow of power to the reactor is taken from the transmission at a point further from the prime mover than the reactor, a condition of circulating power exists.

Generalizing therefore, when power is extracted from a point in a transmission of the above-referred-to type, and returned thereto through the variable-speed system to a point nearer the prime mover than the point from which it was extracted, a condition of circulating power or power feed-back occurs which may equal or exceed the total power transmitted through the transmission. For example, the epicyclic transmission previously referred to is essentially a device for reducing the speed of the output shaft to ⅓ that of the input shaft and accordingly, multiplying the torque of the input shaft three times. Should such a transmission be required to produce an output speed equal to the input speed, the epicyclic gearing would still multiply the input torque three times and a condition would exist whereby the apparent output power of the epicyclic unit alone would be three times the input power (speed times torque). Assume an input speed of 1200 R. P. M., an input torque of 1000 inch pounds, and that the one end of the variable-speed system is connected to the output shaft with its other end connected to the reactor. Should 1200 R. P. M. be required at the output shaft, then 3000 inch pounds of torque should also be present. However, since the transmission can only deliver 1000 inch pounds of torque at 1200 R. P. M., 2000 inch pounds of torque at 1200 R. P. M. must be absorbed from the output shaft by the variable-speed system and delivered to the reactor as power which causes its rotation in a manner to provide the required speed of 1200 R. P. M.

As will be shown later in column 8, from the gear train value formula (Elements of Mechanics, Schwamb, Merrill and James, 6th edition, p. 300), the reactor speed for this illustration is 600 R. P. M. and since the torque of the reactor is 4/3 that of the output torque (4×input torque) or 4000 inch pounds, it will be evident that the product of reactor speed times reactor torque is twice the product of speed times torque of the input or output shafts. Therefore, twice as much feed-back power is being circulated in the transmission as is being passed through it.

Assume again that the transmission is operated at an output speed below "base" speed, say, 133 R. P. M., and the one end of the variable-speed system is connected to the input shaft, and the other end to the reactor. Under these conditions, 9000 inch pounds of torque would be required at the output shaft if the transmission is to deliver the total power supplied to it. To get such torque, power will have to be absorbed from the reactor to develop 2000 inch pounds additional torque to complement the input torque of 1000 inch pounds—the sum being multiplied by the epicyclic gearing to produce the final 9000 inch pounds output torque. The reactor speed for this illustration is 200 R. P. M. and the reactor torque is again 4/3 of output torque or, in this case, 12,000 inch pounds [4×(input torque+2000)]. Accordingly, the product of reactor torque and reactor speed (feed-back power) is again twice the power of the input or output shafts.

From the foregoing, it is evident that prior-known transmissions of this type if required to operate over a substantial range on each side of "base" speed must be provided with a relatively large variable-speed auxiliary means capable of handling considerably more power than that which is delivered by the transmission.

It has been found that when power is extracted from a point in a transmission of the above-referred-to type, and returned thereto through the auxiliary variable-speed system to a point no further removed from the output shaft than the point from which it is extracted, then a condition occurs, which, for the purpose of this invention and to distinguish from feed-back power, will be referred to as transfer power. Unlike the feed-back power, this transfer power never equals or exceeds the total power that passes through the transmission. That is to say, when power is supplied to the reactor of the epicyclic gearing from the input side of said gearing for varying the speed-torque characteristics of the output shaft; and when the power extracted from the reactor of said gearing to vary said characteristics is returned to the transmission on the output side of said gearing, then the above-described condition of transfer power exists and no circulating power is present. Maintaining this relationship of transfer power permits the design of a transmission of this type wherein the capacity of power transmission of the auxiliary variable-speed system may be small in relation to the total power transmitted through the transmission.

The principal object of this invention is to provide an infinitely variable-speed transmission including epicyclic gearing in which no circulating or feed-back power is developed over the entire operating range of said transmission.

Other objects include the provision of such a transmission in which an auxiliary variable-speed mechanism is employed to vary the output characteristics of speed and torque of the transmission; the provision of such a transmission in which throughout the latter's entire operating range, the variable-speed mechanism is required to pass less power than the total power that passes through the transmission; the provision of such a transmission in which the power transmitting capacity of the auxiliary variable-speed mechanism may be reduced to a point where it is required to pass only a fraction of the total power transmitted through the transmission; the provision of such a transmission in which the operating range may extend from zero to a value in excess of input speed; the provision of such a transmission in which substantially constant horsepower is developed over substantially the entire operating range of the transmission; the provision of such a transmission in which the output torque thereof may be intentionally limited at low output speeds to prevent damage to the driving or driven mechanism; the provision of such a transmission in which the output torque can be controlled and varied throughout the speed range of the transmission to provide substantially constant horsepower, substantially constant torque, or a combination of the two throughout substantially the entire speed range of the transmission; the provision of such a transmission so designed that throughout its operating range there is a plurality of output speeds at which no power is required to be transmitted by the variable-speed mechanism; and the provision of such a transmission in which a substantially exact ratio of input to output speed is obtained regardless of the percentage of full load passing through the transmission.

The above, as well as other objects and novel features of the invention will become apparent from the following specification and accompanying drawings, in which.

Figures 1, 11:
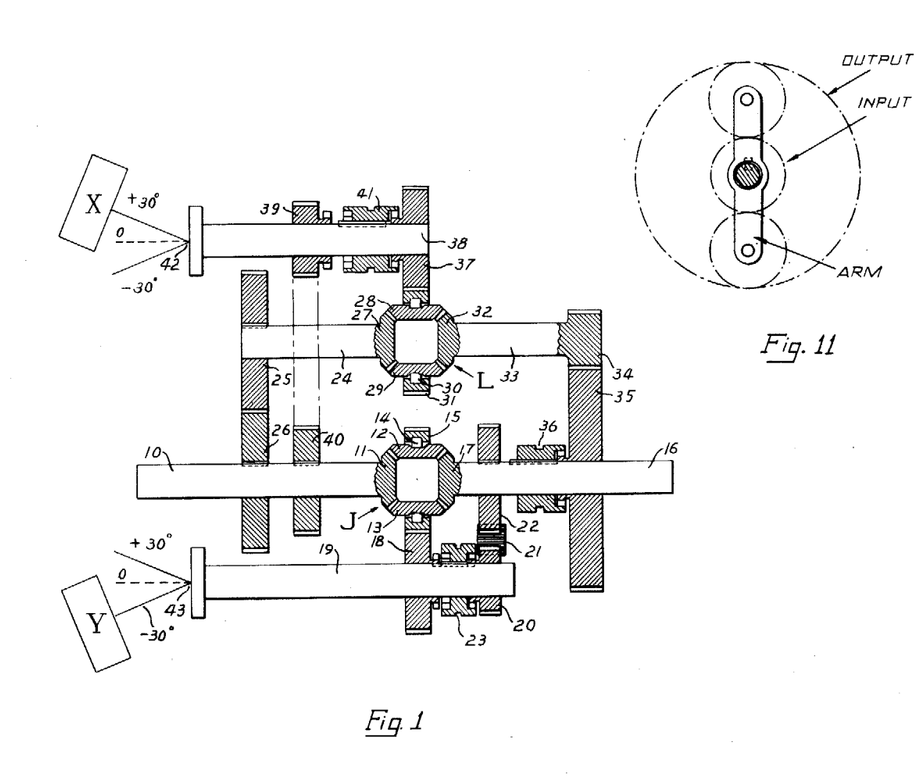
Figure 1 is a schematic diagram of a transmission to which the principles of the invention have been applied.
Fig. 11 is a schematic diagram of a 3:1 epicyclic gear train.

Referring to Fig. 1, the principles of the invention are shown as applied to a transmission including an input shaft 10 to the one end of which is fixed a bevel pinion 11 that meshes with two planet bevel pinions 12 and 13 mounted within a planet carrier 14. A spur gear 15 is fixed to the outer periphery of carrier 14. An output shaft 16 has fixed to its one end a bevel pinion 17 that meshes with planet gears 12 and 13 forming therewith and with pinion 11 an epicyclic gear train J of usual construction which although shown as having a gear ratio of 1:1 may obviously be of any desired ratio.

A spur gear 18 loose on an auxiliary shaft 19 meshes with the gear 15 on planet carrier 14, and in the embodiment shown in Fig. 1, the gear ratio therebetween is 1/1. Another spur gear 20 is free on shaft 19 and it drives or is driven through an idler 21 in a 3/2 relation with a gear 22 keyed to shaft 16. A slidable clutch 23 is splined to shaft 19 so that shaft 19 may be driven by or drive gears 15 or 22 depending upon the position in which clutch 23 is located.

An auxiliary shaft 24 has a spur gear 25 keyed to its one end and is in 1:1 mesh with a gear 26 keyed to shaft 10. The other end of shaft 24 is provided with a sun bevel gear 27 that meshes with planet bevel gears 28 and 29 supported by a planet carrier 30 having a spur gear 31 on its outer periphery. Planet gears 28 and 29 mesh with another sun gear 32 fixed to a shaft 33, and the assembly forms an epicyclic gear train L that is similar to train J. To the outer end of shaft 33, a spur gear 34 is fixed that meshes in a 4:1 relation with a gear 35 loose on shaft 16. A clutch 36 is provided for connecting and disconnecting gear 35 to and from output shaft 16.

A spur gear 37 loose on a shaft 38 meshes in a 1:1 relation with the gear 31, and another gear 39 loose on shaft 38 meshes in a 3:2 relation with a gear 40 keyed to shaft 10. This driving relation is illustrated in the schematic sketch by dot and dash lines. A clutch 41 is splined to shaft 38 and is employed to connect individually, either gears 37 or 39 to shaft 38.

From the foregoing, it is evident that shafts 19 and 38 provide the reaction points for the epicyclic trains J and L. Between these two shafts is provided a variable-speed mechanism, preferably of the infinitely variable type, and although not essentially of the hydraulic type, is shown as including similar units X and Y of the variable capacity hydraulic type generally similar to the construction shown in patent to Hans Thoma No. 1,931,969.

The shaft 38 is connected to a hydraulic unit X, and the shaft 19 is connected to a hydraulic unit Y. These units are of the hydraulic variable-displacement type as referred to above, and their displacements can be varied by pivoting them about points 42 and 43. In the dotted line positions, the displacement of the unit is zero and as such the units idle.

While the present embodiment of the invention discloses only two epicyclic gear trains "J" and "L," it is evident that additional epicyclic trains may be employed with connections therefrom to the output shaft with intermediate gear ratios. The reactors of these additional epicyclic gear trains would be selectively clutched to shafts 38 and 19 to provide additional intermediate ranges of power flow prior to the power passing directly through the epicyclic gearing arrangement "J." Such increase in the intermediate ranges of power flow would further reduce the power transmitted through the auxiliary variable-speed mechanism.

Assume that the apparatus is set such that the displacement of unit X is zero and that of Y is $-30°$; that shaft 10 is rotated at a constant speed of 1000 R. P. M. by a prime mover that is capable of impressing 4000 inch pounds thereon, clutch 41 is in engagement with gear 37, clutch 23 is in engagement with gear 20, and clutch 36 is in engagement with gear 35.

Under the above circumstances, the speed of the output shaft 16 is zero since the displacement of X is zero, which latter permits carrier 30 to rotate freely, hence shaft 33 does not rotate. Not only does shaft 16 not rotate by virtue of the idle condition of carrier 30, but since the displacement of unit X is 0, no oil can be pumped between units X and Y, and accordingly, a locked condition of shaft 16 exists. Changing the displacement of the unit X to positive values while retaining the Y unit at $-30°$ causes the former to pump liquid to unit Y which in turn tends to rotate shaft 16 through gears 20, 21 and 22. Rotation of the input shaft tends to rotate shaft 33 since reaction torque on carrier 30 is being developed by the resistance to the rotation of unit X.

Figure 9:
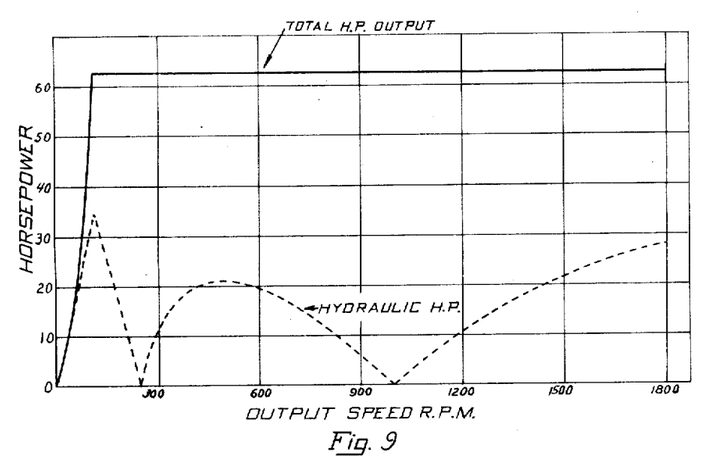
Fig. 9 is a graph showing the horsepower characteristics of the apparatus of Fig. 1.
Figure 10:
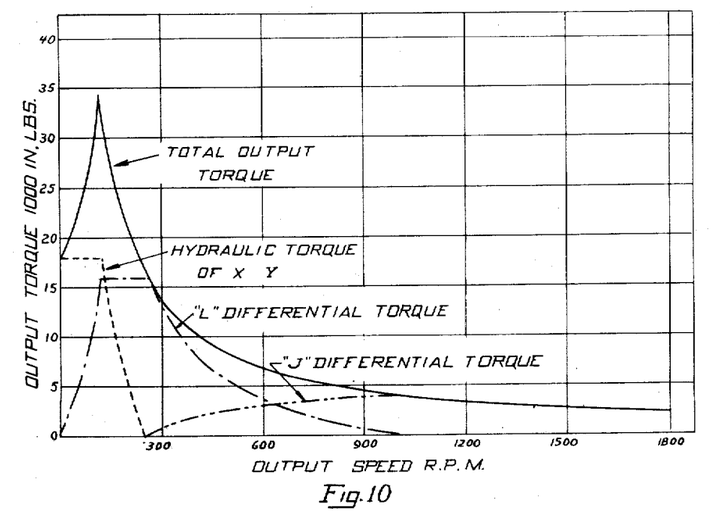
Fig. 10 is a graph of the torque characteristics of the apparatus of Fig. 1.

Referring to Figs. 9 and 10, characteristics of the transmission disclosed in Fig. 1 are shown graphically under a theoretical performance based on an input speed of 1000 R. P. M., 4000 inch pounds torque and an assumed efficiency of 100%. The solid line curve of Fig. 9 represents total horsepower output of the transmission which, for the embodiment disclosed, is substantially constant throughout substantially the entire speed range thereof; the dotted line curve represents that portion of the total horsepower that passes through the variable-speed mechanism and which, in the embodiment disclosed, is hydraulic power. In Fig. 10, the solid line curve represents the total output torque of the transmission; the dotted line curve represents the torque developed by the hydraulic units X and Y and which is delivered to the output shaft; the dot and dash line curve represents the torque passing through the epicyclic gearing "L," and the dash-dot-dot line curve represents the torque passing through hte epicyclic gearing "J." It will be noted that the dotted line curve of Fig. 9 contacts the abscissae at three points during the entire speed range of the transmission—the two points other than the one at zero speed representing "base" speed points of the two epicyclic gearing units of the embodiment disclosed.

Displacement of the unit X from zero as above stated, and depending upon the load to be rotated by the output shaft, pressure will be built up in the hydraulic system until sufficient torque has been developed to cause rotation of the shaft 16. For the design under consideration, a maximum pressure of 2500 p. s. i. and a maximum displacement for each of the hydraulic units X and Y of 30 cubic inches per revolution has been selected. Under these conditions, it is evident from Fig. 10 that a maximum stall torque of 18000 inch pounds will be developed. This can be substantiated through reference to standard hydraulic formulae.

The displacement of the X unit increases up to the maximum amount required to develop sufficient resistance in the "L" epicyclic train (Fig. 1) to pass full input torque to shaft 33. Simultaneously, the output torque on shaft 16 and the horse-power passed through the transmission increases to the full amount supplied from the prime mover. It is also evident from Fig. 9 that the hydraulic portion of this power passing through the variable-speed unit during this portion of the first phase of operation increases to a maximum. Accordingly, it is evident that at this point of operation, namely, 118 R. P. M., the hydraulic unit Y supplies 18,000 inch pounds of torque to the output shaft 16 and the remaining 16,000 inch pounds of torque is composed of 4,000 inch pounds passing directly through the epicyclic train "L" multiplied by the gear ratio 4:1 of gears 34, 35. This total torque of 34,000 inch pounds is sufficient to develop full horsepower at the output shaft at a speed of 118 R. P. M., thereby satisfying the equation $S_i/S_o = T_o/T_i$, at 100% efficiency.

Increasing the displacement of unit X to a maximum of $+30°$ and thereafter changing the displacement of unit Y from $-30°$ to zero, causes shaft 16 to increase in speed so that decreasing values of output torque are required to maintain constant horsepower (Figs. 9 and 10).

Since it is the aim of this invention to pass as nearly as possible full power through the epicyclic gearing, it is necessary to develop sufficient reaction torque by the X unit to permit full input torque to reach shaft 33. Maintaining this relationship of sufficient reaction torque by X (constant) as the total output torque decreases with increasing output speed, it follows that the hydraulic torque and power of the Y unit decrease to maintain constant output horsepower. This condition prevails until shaft 16 is rotating at 250 R. P. M. when all hydraulic power flow through the variable-speed system ceases and all power output passes directly through the epicyclic gearing "L." Under this condition of unit Y being at zero displacement, shaft 38 is locked and shaft 19 is permitted to idle. Locking of shaft 38 stops carrier 30, hence shaft 33 rotates at 1000 R. P. M.—the base speed of the epicyclic gear train "L"; and shaft 16 rotates at 250 R. P. M. while shaft 19 idles at 375 R. P. M., because the gear ratio between gears 22 and 20 is 3:2.

Since shafts 10 and 16 are rotating at 1000 and 250 R. P. M., respectively, carrier 14 and gear 18 are idling at 375 R. P. M. Accordingly, clutch 23 can be shifted from engagement with gear 20 to engagement with gear 18. This shifting conditions the apparatus so that phase 2 of the operation of the transmission can be developed, namely, increasing the output speed from 250 R. P. M. to 1000 R. P. M. for the embodiment disclosed.

With clutch 23 shifted to engage gear 18, all output power continues to be transmitted through epicyclic gear train "L" to the output shaft 16 since such shifting in no way changes the apparatus from its condition at the end of phase 1.

Changing the displacement of unit Y from 0 (its displacement at the end of phase 1) to positive values (they were negative in phase 1) causes unit Y to pump liquid to unit X rotating the latter oppositely from its rotation during phase 1. It will be remembered that at the end of phase 1 the rotation of carrier 30 was zero due to the locking of gear 37 against rotation when the displacement of unit X was $+30°$ and that of unit Y equal to zero. Accordingly, in phase 2, as carrier 30 is rotated in the opposite direction from that in phase 1, the speed of shaft 33 continues to increase. As the speed of the output shaft 16 increases during phase 2 (see Fig. 9), constant output horsepower can be maintained with a reduction of total output torque. This condition can be satisfied without developing any circulating horsepower by initiating the transmission of torque through the "J" epicyclic gear train and reducing the amount of torque transmitted through the "L" train.

As the speed of shaft 33 increases above 1000 R. P. M., shaft 16 also increases in speed above 250 R. P. M. and consequently, the speed of carrier 14 decreases since its speed is half the difference of that of shafts 10 and 16 in the embodiment disclosed. Correspondingly, the increasing displacement of the Y unit creates an increasing reaction on the carrier 14 sufficient to transmit increasing amounts of torque from shaft 10 directly through the train "J" to output 16. Accordingly, decreasing amounts of torque remain in shaft 10 to be transferred by gears 26 and 25 to the train "L," thence to shaft 16. This condition prevails as the displacement of unit Y is changed to +30°, the maximum of the embodiment disclosed, and the displacement of the unit X is changed from +30° to zero. When this latter condition has been reached, the circulation of oil between units X and Y is again stopped, locking carrier 14 against rotation, at which point, the speed of shaft 16 will be 1000 R. P. M., and that of shaft 33 will be 4000 R. P. M.

When this latter condition occurs, namely, unit $X=0$ and unit $Y=30°$, the X unit cannot produce any reaction on carrier 30, and consequently, no torque or power can be transmitted from shaft 24 to shaft 33 through train "L." Furthermore, when this condition occurs, there is no hydraulic liquid flow between units X and Y, and carrier 14 is therefore prevented from rotating. Consequently, all the input torque on shaft 10 must be transmitted through the train "J." The above explanation is graphically shown in Fig. 10.

With output shaft 16 rotating at 1000 R. P. M., and shaft 33 at 4000 R. P. M., carrier 30 rotates at half the difference of the speeds of shafts 24 and 33 for the embodiment shown, or 1500 R. P. M. Likewise, gear 39 is rotating at 1500 R. P. M., so that clutch 41 can be shifted from engagement with gear 37 to engagement with gear 39, and clutch 36 shifted out of engagement with gear 35 without in any way affecting the flow of all the input torque and power directly through the train "J." With the apparatus in the condition just described, the third phase of operation can be developed, namely, rotating shaft 16 at speeds in excess of that of input shaft 10.

Referring to Fig. 10, it is evident that all of the input torque and power is transmitted directly through the train "J" at the beginning of phase 3, and less torque is required during phase 3 at increased speeds of shaft 16 to maintain constant output horsepower. This condition has been attained by taking off part of the input torque from shaft 10 and transmitting it through gear 40 and utilizing it to rotate unit X as the latter's displacement is changed from zero (its position at the end of phase 2) to negative values of increasing amount. The power absorbed by the X unit is transmitted hydraulically to the Y unit. It is used to cause the rotation of carrier 14 at a rate, and with sufficient torque to permit the train "J" to pass the required output torque at the desired output speed while maintaining constant output horsepower.

Figure 2:
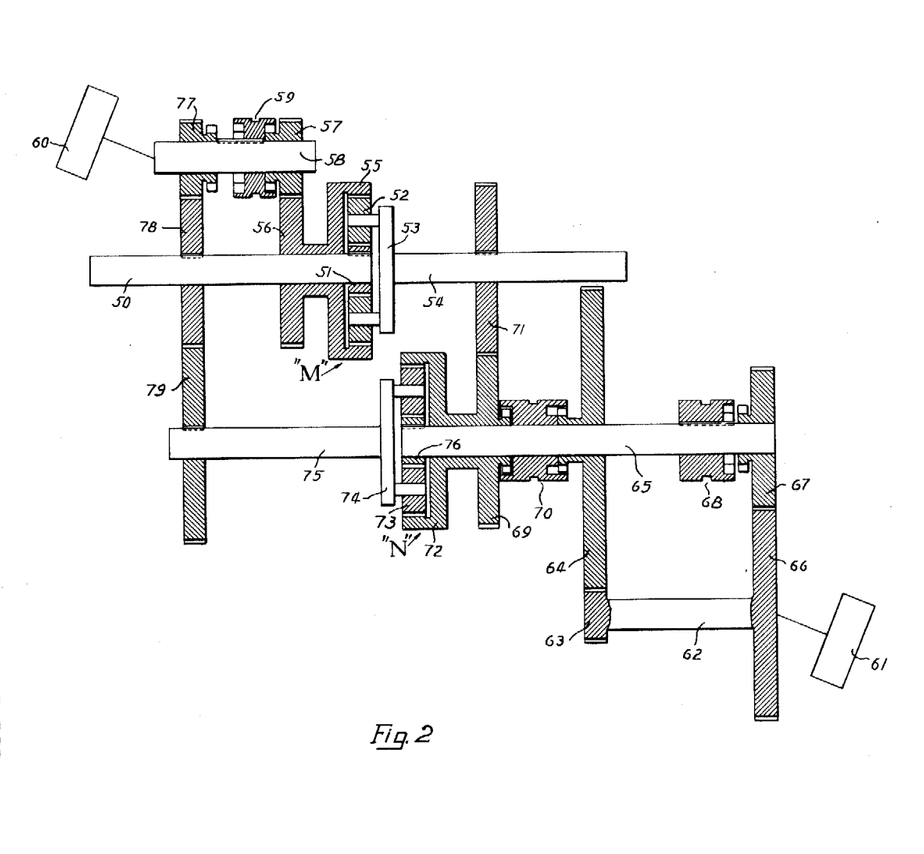
Fig. 2 is a schematic diagram of a modified form of transmission to which the principles of the invention have been applied.

Referring to Fig. 2, a modification of the apparatus shown in Fig. 1 is disclosed. It includes an input shaft 50 that is connected to an epicyclic gear train "M" having a sun gear 51 keyed to one end of shaft 50 and meshing in a 1:1 relation with planet gears 52 mounted on a planet carrier 53 that is fixed to an output shaft 54. A ring gear 55 includes internal teeth that mesh with the planet gears 52 in a 3:1 relation in the embodiment shown. The ring gear 55 is integral with a spur gear 56 and both are journaled on shaft 50. Spur gear 56 meshes in a 2:1 relation with another spur gear 57 that is journaled on a shaft 58 to which gear 57 is adapted selectively to be clutched by a sliding clutch 59.

Shaft 58 is drivingly connected to a hydraulic unit 60 similar to that shown in Fig. 1, which is hydraulically connected to a similar unit 61. The unit 61 is drivingly connected to a shaft 62 that fixedly supports a spur gear 63 which meshes in a 6:1 relation with a spur gear 64 journaled on a shaft 65. Also fixed to the shaft 62 is a spur gear 66 that meshes in a 3:2 relation with a gear 67 journaled on shaft 65. Gear 67 is adapted selectively to be connected to shaft 65 by a sliding clutch 68.

The gear 64 is adapted selectively to be connected to another spur gear 69 by sliding clutch 70. However, clutch 70 does not connect either of the gears 64 or 69 to shaft 65, but only to each other. Gear 69 not only meshes in a 1:1 relation with a gear 71 that is keyed to the driven shaft 54, but it also is integral with a ring gear 72 forming part of another epicyclic gear train "N." Ring gear 72 meshes in a 3:1 relation with planet gears 73 mounted on a planet carrier 74 that is fixed to a shaft 75. The planet gears 73 mesh with a sun gear 76 that is keyed to shaft 65.

The shaft 58 also supports a spur gear 77 that is adapted selectively to be connected to the shaft 58 by sliding clutch 59. Gear 77 meshes in a 1:2 relation with a spur gear 78 keyed to input shaft 50, which latter gear meshes in a 3:4 relation with a gear 79 keyed to shaft 75.

The above description of the elements of the transmission is a mere catalogue of parts, and, therefore, the following description is believed necessary to properly disclose the functional relationship of the various elements. It is, of course, evident that additional epicyclic trains may be employed as previously pointed out in connection with Fig. 1.

At this point, it is believed advisable to point out the relation between the speeds of the various gears in an epicyclic gear train in order to better understand the functioning of the apparatus.

As suggested at an earlier point in this specification, the gear train value of any epicyclic train can be expressed as follows:

$$e = \frac{\text{speed of the last wheel relatively to the arm}}{\text{speed of the first wheel relatively to the arm}}$$

considered with the arm held fixed.

Referring to Fig. 11, wherein a schematic diagram of an epicyclic gear train having a ratio of 3:1 is shown, the gear train value is:

$$e = \frac{\text{speed of ring gear} - \text{speed of arm}}{\text{speed of input} - \text{speed of arm}}$$

$$= \frac{-400 - 0}{+1200 - 0} = \frac{-1}{3}$$

This gear train is the one used in the illustration in column 2, lines 23 to 51.

Referring to Fig. 1, wherein the epicyclic gear trains have a ratio of 1:1, the gear train value is:

$$e = \frac{\text{speed of 32} - \text{speed of 30}}{\text{speed of 27} - \text{speed of 30}}$$

$$= \frac{1000 - 0}{-1000 - 0} = -1$$

Referring to Fig. 2, wherein the epicyclic gear trains have a ratio of 4:1, the gear train value is:

$$e = \frac{\text{speed of 55} - \text{speed of 53}}{\text{speed of 51} - \text{speed of 53}}$$

$$e = \frac{-333 - 0}{1000 - 0} = \frac{-1}{3}$$

Accordingly, having the gear train value and knowing two of the speed values in an epicyclic train, permits finding the third. Since the train "N" is identical with the train "M," the same relationship exists.

Assume that unit 60 is set at 0°; unit 61 at −30°; shaft 50 rotating at a constant speed of 1000 R. P. M., say in a positive direction; clutch 59 in engagement with gear 57; clutch 70 in engagement with gears 64 and 69; and clutch 68 disengaged from gear 67. Under these conditions, shaft 54 does not rotate because there is a locked gear train from shaft 54 through gears 71, 69, clutch 70, gears 64, 63, shaft 62 to unit 61 which cannot be rotated since the displacement of unit 60 is zero. However, gear 55 is rotating at a −333 R. P. M., and shaft 58 is rotating at +666 R. P. M. with unit 60 idling at that speed. Since shaft 50 is rotating at +1000 R. P. M., shaft 75 rotates at −750 R. P. M.

From the above equation, sun gear 76 is rotating at:

$$-\frac{1}{3} = \frac{S_{72} - S_{74}}{S_{76} - S_{74}} = \frac{750}{S_{76} + 750} \text{ or } S_{76} = -3000 \text{ R. P. M.}$$

Accordingly, shaft 65 is idling at −3000 R. P. M. since clutch 68 is disengaged.

Throughout the following discussion, it may be helpful to refer to Figs. 9 and 10 since the relationships shown therein generally apply to the transmission of Fig. 2, although the numerical values are, of course, different due to the different gear ratios involved.

Changing the displacement of unit 60 from zero to positive values, while retaining the displacement of unit 61 at −30° causes unit 60 to pump liquid to unit 61 tending to rotate it as a motor in a positive direction and tending to drive the output shaft 54 through gears 63, 64, 69 and 71 in a positive direction. The increasing positive displacement of unit 60 applies an increasing reaction on the ring gear 55 to pass the full input torque to shaft 54. Accordingly, the torque and horsepower passing through the transmission increase to the full amount supplied from the prime mover. The hydraulic portion of this power also increases to a maximum during this portion of the first phase of operation in the same manner as it did in the embodiment of Fig. 1. Accordingly, as the displacement of unit 60 is moved off zero, initially, the pressure in the system increases until the stall torque of the load applied to shaft 54 is overcome, from which point increasing the displacement of unit 60 causes shaft 54 to start rotating and also impresses increasing reaction on the gear 55 of the epicyclic train "M" so that torque is transmitted in increasing amounts through the train "M." This mechanical torque combines with the constant amount of torque being transmitted to the output shaft through the hydraulic units 60 and 61. As the displacement of unit 60 increases, shaft 54 increases in speed until a speed has been attained where full horsepower is transmitted through the transmission to satisfy the torque-speed equation previously referred to.

As the speed of shaft 54 increases beyond that at which full torque from the input shaft 50 is transmitted to shaft 54 through the epicyclic train "M," nothing occurs to cause the torque so transferred to decrease and consequently, it remains constant and at full value. However, during this portion of phase 1, decreasing amounts of total output torque are required to maintain constant horsepower output. Consequently, less and less amounts of torque from the hydraulic unit 61 is required and, therefore, less and less hydraulic power is transmitted to shaft 54 from unit 61.

The above-described condition of rotation shaft 54 at increasing speeds continues as the displacement of unit 60 is increased in a positive manner, and as the displacement of unit 61 is adjusted from −30° to zero. During this adjustment of units 60 and 61, two complementary conditions occur, namely, the resistance caused by operating unit 60 as a pump impresses a reaction on ring gear 55 tending to slow it down, and the rotation of shaft 54 by the action of motor 61 also tends to reduce the speed of ring gear 55. When the unit 61 is at zero displacement with unit 60 at +30°, ring gear 55 stops rotating by virtue of the locked condition of units 60 and 61. Under this condition, shaft 54 and ring gear 72 are rotating at 250 R. P. M. (from above formula). At this speed of 250 R. P. M. of shaft 54, all the hydraulic power flow through the variable-speed system ceases and all power output passes directly through the epicyclic gearing "M." Additionally, shaft 75 is still rotating at −750 R. P. M., and the speed of gear 76 is −2250 R. P. M. Since shaft 54 is rotating at +250 R. P. M., gear 67 is rotating at −2250 R. P. M. Accordingly, clutch 68 can be shifted into engagement with gear 67.

The second phase of operation of the species shown in Fig. 2 begins with clutch 59 in engagement with gear 57; clutch 70 disengaged from gear 69 and clutch 68 in engagement with gear 67. Shaft 50 is still rotating at +1000 R. P. M.; shaft 54 is rotating at +250 R. P. M.; the displacement of unit 60 is +30° and that of unit 61 is 0.

It will be remembered that at the end of phase 1 shaft 54 was rotating at 250 R. P. M. and that unit 60 was not rotating since its displacement was +30° and that of unit 61 was 0. However, unit 61 was idling under its zero displacement by the rotation of shaft 54, which was rotating shaft 62 at +1500 R. P. M. However, when clutch 70 is shifted to disengage gear 69 from gear 64, unit 61 then idles under the influence of sun gear 76 which is rotating at this point at +2250 R. P. M. Changing the displacement of unit 61 to positive values (they were negative during phase 1), while retaining the displacement of unit 60 at +30°, reverses the flow of fluid between units 60 and 61 from that of phase 1, thereby rotating ring gear 55 in a positive direction or opposite from that which it was rotated during phase 1 (it was not rotating at the end of phase 1).

As unit 61 is changed to +30°, and unit 60 is changed from + 30° to 0, shaft 54 increases in speed since unit 60 is now acting as a motor rotating gear 55 in a positive direction; and gear 76 decreases in speed as shaft 54 and gear 72 increase in speed. Accordingly, sun gear 76 continues to decrease in speed until shaft 54 attains a speed of +1000 R. P. M., when shaft 65 and unit 61 stop rotating, the latter occurring by virtue of the displacement of unit 61 being +30° and that of unit 60 being 0°. The speed and direction conditions can easily be substantiated by the above gear train equation.

For the same reason that the total torque output is delivered by the two epicyclic gear trains "L" and "J" of Fig. 1 between the start and finish of phase 2 of the operation of the transmission, the total torque output for the embodiment of Fig. 2 is likewise delivered by the two epicyclic trains "M" and "N" as generally shown in Fig. 10.

At the end of phase 2, the unit 61 is at a displacement of +30° and that of unit 60 is at 0°; sun gear 76 is not rotating; and gear 55 as well as gear 56 are rotating at +1000 R. P. M. (from the above gear train equation). Accordingly, gears 77 and shaft 58 are each rotating at −2000 R. P. M., and clutch 59 can be shifted from engagement with gear 57 into engagement with gear 77. With the other clutches remaining in the positions they were during phase 2, phase 3 can be developed.

At the beginning of phase 3, unit 60 is idling at −2000 R. P. M. under zero displacement. Increasing its displacement from 0° to negative values causes it to become a pump moving liquid from unit 60 to 61 and causing unit 61 to act as a motor which rotates in a negative direction which is opposite from that during phase 2. The negative rotation of unit 61 rotates sun gear 76 in a positive direction which is opposite to its rotation during phase 2 wherein, as it decreased in speed, the speed of shaft 54 increased. Accordingly, this rotation of sun gear 76 in a positive direction increases the speed of rotation of the shaft 54 which can be substantiated by the gear train formula.

As the speed of output shaft 54 increases above the speed of input shaft 50, less and less total torque is required on shaft 54 to maintain constant output power in accordance with the torque-speed equation. Since clutch 59 is in engagement with gear 77, no torque can be transmitted through the epicyclic gear train "M" and all must flow directly through the train "N" in the same manner as it flowed in the embodiment of Fig. 1 and as generally shown in Fig. 10.

Referring to Figs. 3 to 8 inclusive, schematic control apparatus is shown for operating the hydraulic units in a manner to produce the desired results. Although it is equally applicable to the species shown in Figs. 1 and 2, it will be described in connection with that shown in Fig. 2.

Figure 3:
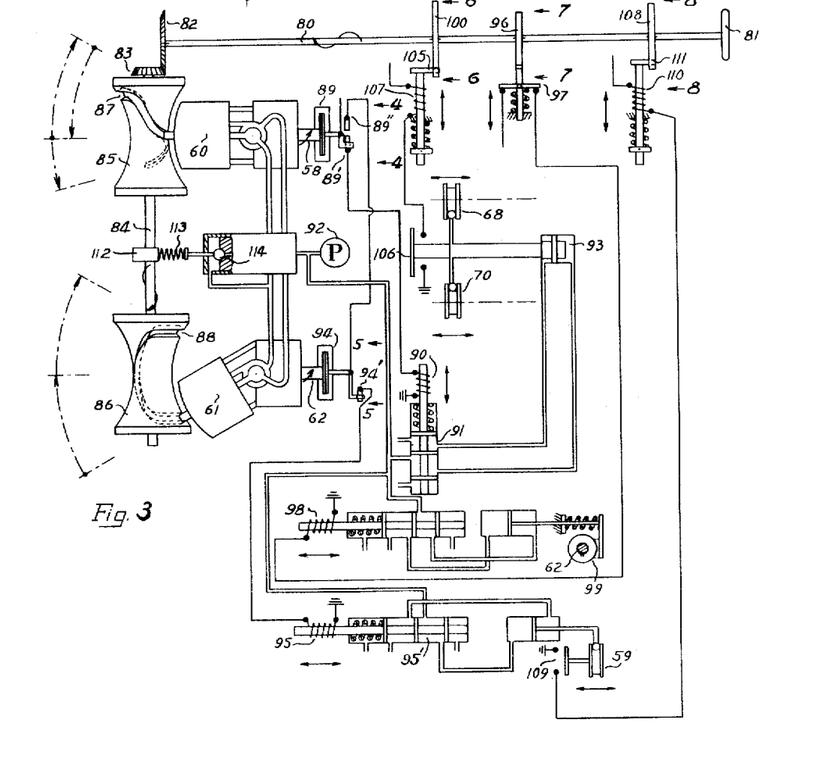
Fig. 3 is a schematic arrangement of a control for operating the transmissions of Figs. 1 and 2 in a manner to produce the desired results.

An operating cam shaft 80 includes a hand wheel 81 at its one end and a bevel pinion 82 at its other end that meshes with another bevel gear 83 fixed to another cam shaft 84 on which latter is mounted barrel cams 85, 86. Cam tracks 87, 88 on cams 85, 86 are designed to maintain the proper relationship between units 60 and 61 to produce infinitely variable speeds throughout an uninterrupted complete operation of the cams 85 and 86.

With the apparatus in the condition shown in Fig. 3, shaft 50 is rotating at +1000 R. P. M.; unit 60 is at 0° displacement; unit 61 is at —30° displacement; and shaft 58 is idling at +666 R. P. M. Accordingly, unit 61 is not rotating and shaft 62 is not rotating.

A zero-speed limit switch 89 operated by unit 60 includes a contact 89' that is closed energizing a solenoid 90, thereby actuating a valve 91 to admit liquid from super-charging pump 92 through valve 91 at the right-hand side of cylinder 93, thereby causing clutches 68 and 70 to move leftwardly (see Fig. 2) causing disengagement of gear 67 from shaft 65 and engagement of gears 64 and 69.

A zero-speed switch 94 that is operated by unit 61 includes a contact 94' that is closed since unit 61 is not rotating. However, since contact 89" is open, solenoid 95 is de-energized causing a valve 95' to pass liquid from pump 92 to move clutch 59 rightwardly (see Figs. 2 and 3) clutching gear 57 to shaft 58.

A cam 96 on shaft 80 normally holds switch 97 closed, thereby energizing solenoid 98 so that pressure liquid causes a brake 99 to be applied to shaft 62 (Fig. 3). Under the above conditions, rotation of shaft 50 (Fig. 2) at 1000 R. P. M. produces no rotation of shaft 54 as previously explained.

Figure 4:
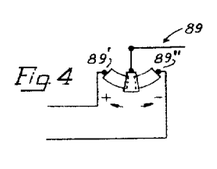
Figs. 4 to 8 inclusive are details of the control of Fig. 3.
Figure 5:
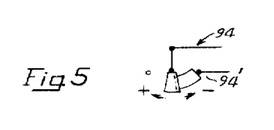
Figure 6:
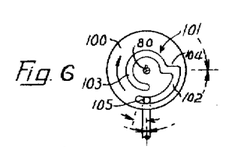
Figures 7, 8:
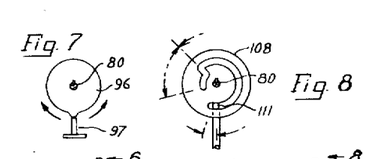

The switches 89 and 94 are commercial items and are schematically shown in Figs. 4 and 5. From an inspection of these figures, contacts 89' and 89" are closed when unit 60 is not rotating; contact 89' is closed and 89" open when unit 60 is rotating in a positive manner; and contact 89" is closed with contact 89' open when unit 60 is rotating in a negative manner. Contact 94' of zero-speed switch 94 is closed when unit 61 is stopped or rotating in a negative manner, and open when said unit is rotating in a positive manner.

Immediately upon turning hand wheel 81, cam 96 permits opening of switch 97, de-energizing solenoid 98, thereby releasing brake 99. During the first 83° of rotation of hand wheel 81, or 166° rotation of cams 85 and 86, the displacement of the unit 60 changes from 0 to a maximum at +30°, while retaining that of unit 61 at a maximum of —30°. During this portion of the cycle of operation, unit 60 acts as a pump rotating in a positive direction maintaining contact 89' closed, contact 89" open, and pumps liquid to unit 61 to cause it to rotate in a positive direction thereby opening contact 94'.

During the next 83° rotation of hand wheel 81, or 166° rotation of cams 85 and 86, the unit 60 remains at +30° deflection while unit 61 is moved from —30° to 0° which action increases the output speed of shaft 54 to 250 R. P. M. when unit 61 is at 0° deflection. At this point in the cycle, unit 60 has stopped rotating when both contacts 89' and 89" are closed. However, unit 61 is idling in a positive direction, thereby opening contact 94' and preventing any circuit to solenoid 95 being established.

During the next 83° rotation of shaft 80 and 166° rotation of cams 85 and 86, unit 60 is maintained at a +30° deflection while that of unit 61 is changed from 0° to a +30°. This causes the flow of liquid between units 60 and 61 to be reversed so that unit 61 becomes a pump rotating in a positive direction and pumping liquid to unit 60 which acts as a motor rotating unit 60 in a negative direction. Accordingly, as soon as unit 60 begins to rotate in a negative direction, contact 89' opens, contact 89" remains closed and contact 94' opens. Opening of contact 89' de-energizes solenoid 90 thereby effecting the shifting of clutches 68 and 70 rightwardly which (see Fig. 2) disengages gears 64 and 69, and clutches gear 67 to shaft 65. It will be remembered that when the unit 60 is at +30° and unit 61 is at 0°, gear 67 and shaft 65 as well as clutch 68 are rotating at —2250 R. P. M.

(see column 9, lines 48 to 69). Furthermore, since gear 67 is rotating at —2250 R. P. M. by virtue of the rotation of gears 71, 69, 64, 63 and 66 prior to shifting of clutch 68, movement of unit 61 off zero displacement in a positive direction does not affect the speed of gear 67.

In order to prevent the rotation of shaft 80 and cams 85 and 86 into the sector for phase 2 operation before clutches 68 and 70 are shifted, a cam 100 (Fig. 6) is keyed to shaft 80 that includes a track 101 having an arcuate portion 102 of large radius joined to an arcuate portion 103 of smaller radius by a radial portion 104. The cam is fixed on shaft 80 in position such that a follower 105 engages the arcuate sector 102 during phase 1 operation, and comes close to but does not engage radial portion 104 when synchronism between gear 67 and clutch 68 occurs. Further adjustment of the units 60 and 61 until follower 105 engages radial portion 104 causes unit 60 to begin rotating in a negative direction thereby de-energizing solenoid 90 effecting the shifting of clutch 68. Upon shifting of clutch 68 rightwardly (Fig. 3), a switch 106 closes, energizing a solenoid 107 that shifts follower 105 into cooperating position with arcuate portion 103, whereupon continued angular motion of shaft 80 can be effected.

During the next 83° rotation of shaft 80 and 166° rotation of cams 85 and 86, unit 61 is retained at +30° deflection, and unit 60 is adjusted from +30° to zero. This causes an increase in speed of shaft 54 to 1000 R. P. M., and when unit 60 is at zero displacement, it idles in a negative direction at 2000 R. P. M., while gear 77 is also rotating at —2000 R. P. M. (see column 10, lines 35 to 43). Accordingly, contact 89' is still open and contact 89" is closed. Since unit 61 is stopped when unit 60 is at zero displacement, contact 94' is closed. Accordingly, a circuit is established through contacts 89", 94', solenoid 95 to ground thereby moving valve 95' to cause liquid to flow in a manner to move clutch 59 leftwardly (Figs. 2 and 3). Since contact 89' is open, clutches 68 and 70 remain in their rightward position and the transmission is in condition to operate in its third phase, or the overdrive portion of the cycle of operation.

In order to insure that shaft 80 cannot be rotated to adjust units 60 and 61 to produce phase 3 operation prior to gear 77 and shaft 58 being at synchronous speed, a cam 108 (Fig. 8) is keyed to shaft 80 having similar cam paths as those of cam 100, but of different extent. The cam 108 is fixed to shaft 80 in position such that hand-wheel 81 cannot be rotated beyond the position where unit 60 is at zero displacement and unit 61 is at +30° deflection. However, when the above condition occurs, and clutch 59 is shifted leftwardly (Fig. 3), a switch 109 is closed, energizing a solenoid 110 that actuates a follower 111 in a manner to permit further rotation of shaft 80.

During the further rotation of shaft 80 to complete a single revolution thereof, unit 61 is maintained at +30° deflection while unit 60 is moved from 0° to —7°. Such action causes unit 60 to continue to run in a negative direction but to reverse the flow of liquid between units 60 and 61, thereby rotating unit 61 in a negative direction which maintains contact 89' open, contact 89" closed and contact 94' closed so that clutch 59 remains in engagement with gear 77, clutch 68 in engagement with gear 67 and clutch 70 disengaged from gear 69.

In order to limit the torque developed within the transmission to a pre-determined amount to avoid overloading the input and/or the output shafts, as well as damaging the hydraulic system, an adjustable cam 112 is attached to cam shaft 84. The cam 112 is adapted to be adjusted to vary the effect of a spring 113 on a ball check valve 114. The valve 114 controls the maximum hydraulic pressure that can be developed in the auxiliary system. Accordingly, cam 112 can be employed to control the maximum torque developed in the transmission for a pre-determined output speed by adjusting the pressure in the auxiliary system in relation to the position of units 60 and 61.

Although the various features of the new and improved transmission have been shown and described in detail to fully disclose two embodiments of the invention, it will be evident that numerous changes may be made in such details without departing from the principles of the invention.

What is claimed is:

1. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; epicyclic gearing arrangements having movable reactors in each of said power paths; means adapted to extract power from one of said epicyclic gearing arrangements and for returning it to said transmission at the output side of said epicyclic gearing arrangement independently of said other epicyclic gearing; means for supplying power to said one epicyclic gearing which power is extracted from said other epicyclic gearing to cause said output shaft to rotate through another speed range; and means for supplying power to said other epicyclic gearing independently of said one epicyclic gearing, which latter power is extracted from said input shaft to cause said output shaft to rotate through still another speed range.

2. A variable-speed transmission comprising in combination, an input shaft adapted to be rotated and to be subjected to an input torque; an output shaft adapted to be rotated at steplessly variable speeds over a range from zero to speeds in excess of that of said input shaft; plural paths of power flow between said input and output shafts; epicyclic gearing arrangements having movable reactors in each of said power paths; clutches within said power paths; an auxiliary variable-speed system having its one end connected to one of said epicyclic gearing arrangements and its other end connected to another epicyclic gearing; means for adjusting certain of said clutches and said auxiliary system for causing power to flow from said one epicyclic gearing through said system to said output shaft independently of said other epicyclic gearing; means for adjusting certain other of said clutches and said system for causing power to flow from said other epicyclic gearing through said system to said first-mentioned epicyclic gearing; and means for adjusting still other of said clutches and said system for causing power to flow from said input shaft through said system to said second-mentioned epicyclic gearing independently of said first-mentioned epicyclic gearing.

3. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shaft; epicyclic gearing arrangements in each of said power paths; clutches within said power paths; an auxiliary variable-speed system adapted to cooperate with said epicyclic gearing; means for adjusting certain of said clutches and said auxiliary variable-speed system to cause it to apply increasing torque on the reactor of one of said epicyclic gearing arrangements and for transferring power created thereby through said auxiliary variable-speed system to the output shaft of said transmission independently of said other epicyclic gearing until maximum power from said input shaft is transmitted to said output shaft through said one epicyclic gearing; means for adjusting said auxiliary variable-speed system to cause said variable-speed system to decrease the speed of the reactor of said one epicyclic gearing arrangement while the torque thereon remains substantially constant, whereby the power flowing through said auxiliary variable-speed system decreases with increasing speed of the output shaft; means for adjusting other of said clutches and said auxiliary system to apply increasing torque to the reactor of another of said epicyclic gearing arrangements and utilizing said torque to act on the reactor of said one of said epicyclic gearing arrangements to increase the speed of said output shaft whereby decreasing amounts of torque pass through said one of said epicyclic gearing arrangements and increasing amounts pass through said other of said epicyclic gearing arrangements until maximum power from the input shaft passes through said other of said epicyclic gearing arrangements; and means for adjusting still other of said clutches and said auxiliary variable-speed system to cause increasing speed of said output shaft while maintaining said output power substantially constant.

4. In a variable-speed transmission, an input shaft adapted to be rotated; an output shaft adapted to be rotated at steplessly variable speeds over a range from zero to speeds in excess of that of said input shaft; plural power paths between said input and output shafts; epicyclic gearing arrangements in each of said paths, each having rotatable reactors; means for steplessly varying the torque on, and the speed of the reactors of said epicyclic gearing to produce the entire speed range of said output shaft, comprising means for extracting power from said transmission at one point; means adapted to return said extracted power to said transmission at another point; and means for preventing the return of any of said extracted power to said transmission at a point further removed from said output shaft than the point from which said power was extracted.

5. In a variable-speed transmission, an input shaft adapted to be rotated; an output shaft adapted to be rotated at steplessly variable speeds over a range from zero to speeds in excess of that of said input shaft; plural power paths between said input and output shafts; epicyclic gearing arrangements in each of said paths, each having rotatable reactors; clutches within said power paths; an auxiliary variable-speed system for varying the torque on, and the speed of the reactors of said epicyclic gearing to produce the entire speed range of said output shaft; means for adjusting certain of said clutches and said system to cause means within said system to extract power from said transmission at one point; means adapted to return said extracted power to said transmission at another point; and means for preventing the return of any of said extracted power to said transmission at a point further removed from said output shaft than the point from which said power was extracted.

6. A variable-speed transmission comprising in combination, an input shaft adapted to be rotated; an output shaft adapted to be rotated at steplessly variable speeds; plural paths of power flow between said input and output shafts; a first and second epicyclic gearing arrangement in said paths, respectively; clutches within said power paths; an auxiliary variable-speed system including first and second positive-displacement hydraulic units for varying the torque on, and the speed of the reactors of said epicyclic gearing to produce the entire speed range of said output shaft; means for adjusting certain of said clutches and said system to cause said first hydraulic unit to be driven as a pump by the reactor of said first epicyclic gearing, and said second unit to act as a motor for returning power to said transmission at another point; means for preventing the return of any of said power from said second unit to said transmission at a point further removed from said output shaft than the reactor of said first epicyclic gearing; means for adjusting certain other of said clutches and said system to cause said second hydraulic unit to be driven as a pump by the reactor of said second epicyclic gearing and said first unit to be driven as a motor for returning power to said transmission through the reactor of said first epicyclic gearing; and means for preventing the return of any of said power from said first unit to said transmission at a point further removed from said output shaft than the reactor of said first epicyclic gearing.

7. A variable-speed transmission comprising in combination, an input shaft adapted to be rotated; an output shaft adapted to be rotated at steplessly variable speeds over a range from zero to speeds in excess of that of said input shaft; plural paths of power flow between said input and output shafts; a first and second epicyclic gearing arrangement in said paths, respectively; clutches within said power paths; an auxiliary variable-speed system including first and second positive-displacement hydraulic units for varying the torque on, and the speed of the reactors of said epicyclic gearing to produce the entire speed range of said output shaft; means for adjusting said transmission and system to cause said first hydraulic unit to be driven as a pump by the reactor of said first epicyclic gearing, and said second unit to act as a motor for returning power to said transmission at another point; means for preventing the return of any of said power from said second unit to said transmission at a point further removed from said output shaft than the reactor of said first epicyclic gearing; means for adjusting certain other of said clutches and said system to cause said second hydraulic unit to be driven as a pump by the reactor of said second epicyclic gearing and said first unit to be driven as a motor for returning power to said transmission through the reactor of said first epicyclic gearing; means for preventing the return of any of said power from said first unit to said transmission at a point further removed from said output shaft than the reactor of said first epicyclic gearing; means for adjusting still other of said clutches and said system to cause said first hydraulic unit to be driven as a pump by the input shaft, and said second unit to return power to said transmission through the reactor of said second epicyclic gearing arrangement; and means for preventing the return of any of said power from said second unit to said transmission at a point further removed from said output shaft than the reactor of said second epicyclic gearing.

8. A variable-speed transmission comprising in combination, an input shaft adapted to be rotated; an output shaft adapted to be rotated at steplessly variable speeds over a range from zero to speeds in excess of that of said input shaft; epicyclic gearing including rotatable reactor means between said input and output shafts; means for steplessly varying the torque on, and speed of said reactor means to thereby vary the speed and torque of said output shaft throughout its entire range of operation, comprising means for extracting power from said reactor means; means for returning said extracted power to said transmission on the output side of said epicyclic gearing to cause said output shaft to rotate through a range of speeds; means for extracting power from the input side of said epicyclic gearing and for supplying it to said reactor means to cause said output shaft to rotate through another range of speeds; and means for preventing the return of any of said extracted power to said transmission at a point further removed from said output shaft than the point from which said power was extracted.

9. A variable-speed transmission comprising in combination, an input shaft adapted to be rotated; an output shaft adapted to be rotated at steplessly variable speeds over a range from zero to speeds in excess of that of said input shaft; plural paths of power flow between said input and output shafts; epicyclic gearing arrangements in each of said paths; an auxiliary variable-speed system adapted to cooperate with said epicyclic gearing arrangements for varying the speed of said output shaft and for transferring power from one point in said transmission to another; means for adjusting said transmission; and means for adjusting said auxiliary system, said last two means providing a plurality of points throughout said speed range where all power transmitted passes through said epicyclic gearing, and none passes through said auxiliary system.

10. A transmission comprising in combination, an input shaft adapted to be rotated and to be subjected to an input torque; an output shaft adapted to be rotated steplessly over a range of speeds from zero to speeds in excess of that of said input shaft; plural power paths between said input and output shafts; an epicyclic gearing arrangement in each of said paths, each providing a different base speed of said output shaft when the respective reactors thereof are stationary; an auxiliary variable-speed system associated with said transmission and adapted to extract power from one point within said transmission and to return power to said transmission at another point therein; means for connecting the input and output of said system to the reactor of one of said epicyclic gearing arrangements and the output shaft, respectively, for speeds of the latter between zero and the base speed of said epicyclic gearing; means for connecting the input and output of said system to the reactors of two of said epicyclic gearing arrangements for speeds of the output shaft between the base speeds of said epicyclic gearing arrangements; and means for connecting the input and output of said system to the input shaft and the reactor of said epicyclic gearing arrangement other than the first-mentioned, for speeds of the output shaft above base speed of said other epicyclic gearing arrangement.

11. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; epicyclic gearing arrangements in each of said power paths; an auxiliary variable-speed system associated with said variable-speed transmission; means adapted to extract power from one of said epicyclic gearing arrangements and for passing it through said auxiliary system to the output side of said epicyclic gearing arrangement independently of said other epicyclic gearing arrangement; means for extracting power from another of said epicyclic gearing arrangements and for passing it through said system to said one epicyclic gearing arrangement to cause said output shaft to rotate through another speed range; and means for extracting power from said input shaft and passing it through said auxiliary system to said other epicyclic gearing arrangement independently of said one epicyclic gearing arrangement.

12. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; epicyclic gearing arrangements in each of said power paths; an auxiliary variable-speed system including hydraulic positive-displacement units associated with said variable-speed transmission; means adapted to extract power from one of said epicyclic gearing arrangements and for passing it through said auxiliary system to the output side of said epicyclic gearing arrangement independently of said other epicyclic gearing arrangement; means for extracting power from another of said epicyclic gearing arrangements and for passing it through said system to said one epicyclic gearing arrangement to cause said output shaft to rotate through another speed range; and means for extracting power from said input shaft and passing it through said auxiliary system to said other epicyclic gearing arrangement independently of said one epicyclic gearing arrangement.

13. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; epicyclic gearing arrangements in each of said power paths; an auxiliary variable-speed system including hydraulic positive-displacement units associated with said variable-speed transmission; clutches for connecting said hydraulic units to the reactors of said epicyclic gearing units as well as to said input and output shafts; a control for said transmission including means for adjusting said hydraulic units and for shifting said clutches so that initially, increasing torque is applied to the reactor of one of said epicyclic gearing arrangements and power is transferred through said hydraulic system to the output shaft until said reactor is stopped; means in said control responsive to the stopping of said reactor for causing said clutches to be shifted so that upon further operation of said control, increasing torque is applied to the reactor of another of said epicyclic gearing arrangements and power is transferred through said hydraulic system to the reactor of one of said epicyclic gearing arrangements until the reactor of said other epicyclic gearing arrangement stops; and means in said control responsive to the stopping of said last-mentioned reactor for shifting said clutches so that upon further operation of said control, power is transferred from said input shaft to the reactor of said other epicyclic gearing arrangement.

14. A variable-speed transmission comprising in combination, an input shaft adapted to be rotated and to be subjected to an input torque; an output shaft adapted steplessly to be rotated over a speed range from zero to at least the speed of said input shaft; plural paths of power flow between said input and output shafts; epicyclic gearing arrangements in each of said power paths; means adapted to extract power from one of said epicyclic gearing arrangements and for returning it to said transmission at the output side of said other epicyclic gearing arrangement independently of said other epicyclic gearing arrangement; and means for extracting power from another of said epicyclic gearing arrangements and for returning it to said transmission at the reactor of one of said epicyclic gearing arrangements to cause said output shaft to rotate through another speed range.

15. A variable-speed transmission comprising in combination, an input shaft adapted to be rotated and to be subjected to an input torque; an output shaft adapted steplessly to be rotated over a speed range from zero to a speed at least equal to the speed of said input shaft; plural paths of power flow between said input and output shafts; epicyclic gearing arrangements in each of said power paths; an auxiliary variable-speed system including hydraulic positive-displacement units associated with said variable-speed transmission; clutches for connecting said hydraulic units to the reactors of said epicyclic gearing units as well as to said input and output shafts; a control for said transmission including means for adjusting said hydraulic units and for shifting said clutches so that initially, increasing torque is applied to the reactor of one of said epicyclic gearing arrangements and power is transferred through said hydraulic system until said reactor is stopped; and means to the output shaft until said reactor is stopped; and means in said control responsive to the stopping of said reactor for causing said clutches to be shifted so that upon further operation of said control, increasing torque is applied to the reactor of another of said epicyclic gearing arrangements and power is transferred through said hydraulic system to the reactor of one of said epicyclic gearing arrangements until the reactor of said other epicyclic gearing arrangement stops.

16. A variable-speed transmission comprising in combination, an input shaft adapted to be rotated; an output shaft adapted to be rotated at steplessly variable speeds over a range from zero to speeds at least equal to that of said input shaft; plural paths of power flow between said input and output shafts; epicyclic gearing arrangements in each of said paths; means for extracting power from one point in said transmission; means for returning power to said transmission at another point; and means for preventing the return to any of said extracted power to said transmission at a point nearer said input shaft than the point from which it was extracted, said extracting means being adapted to be operated in a manner to provide a plurality of points within the speed range of said output shaft where all power is transmitted through said epicyclic gearing, and none passes through said extracting means.

17. A variable-speed transmission comprising in combination, an input shaft adapted to be rotated; an output shaft adapted to be rotated at steplessly variable speeds over a range from zero to speeds at least equal to that of said input shaft; plural paths of power flow between said input and output shafts; epicyclic gearing arrangements in each of said paths; an auxiliary variable-speed system including positive-displacement hydraulic units adapted selectively to be connected to the input and output shafts, as well as to said epicyclic gearing arrangements; means for adjusting said transmission by effecting said connections; and means for operating said hydraulic units, said last two means providing a plurality of points within said range of speeds where all power passes through said epicyclic gearing arrangements, and none passes through said hydraulic units.

18. In a variable-speed transmission, an input shaft; an output shaft; one of which shafts is adapted to be rotated at a substantially constant speed and the other of which shafts is adapted steplessly to be rotated at varying speeds over a range from zero to speeds at least equal to the speed of the constantly rotating shaft; plural power paths between said input and output shafts; epicyclic gearing arrangements in each of said paths including rotatable reactors; means for steplessly varying the torque on, and the speed of the reactors of said epicyclic gearing to produce the entire speed range of said variable-speed shaft; comprising means for extracting power from said transmission at one point; means adapted to return said extracted power to the transmission at another point; and means for preventing the return of any of said extracted power to said transmission at a point further removed from said output shaft than the point from which said power was extracted.

19. A variable-speed transmission comprising in combination, an input shaft adapted to be rotated; an output shaft adapted to be rotated at steplessly variable speeds; plural paths of power flow between said input and output shafts; epicyclic gearing arrangements in each of said paths; clutches within said power paths; an auxiliary variable-speed system connected between said input and output shafts for varying the torque on, and the speed of the reactors of said epicyclic gearing to produce the entire speed range of said output shaft; means for adjusting certain of said clutches and said system to cause said auxiliary variable-speed system to transfer power from the reactor of one of said epicyclic gearing arrangements to a point in said transmission; means for preventing the return of any of said transfer power to said transmission at a point further removed from said output shaft than the reactor from which said power is extracted; means for adjusting certain other of said clutches and said auxiliary variable-speed system to cause said system to transfer power from the reactor of another of said epicyclic gearing arrangements to the reactor of a different epicyclic gearing arrangement; and means for preventing the return of any of said second-mentioned power to said transmission at a point further removed from said output shaft than the reactor from which it is extracted.

20. A transmission comprising in combination, an input shaft adapted to be rotated at a constant speed; an output shaft; plural power paths between said input and output shafts; an epicyclic gearing arrangement in each of said paths; means for steplessly varying the speed of said output shaft from zero to a speed in excess of that of said input shaft, including an auxiliary variable-speed system capable of transmitting a small amount of power in relation to the power that can be transmitted through said power paths; means for extracting power from one of said epicyclic gearing arrangements and for transmitting it through said auxiliary system to said output shaft independently of said other epicyclic gearing; means for extracting power from another of said epicyclic gearing arrangements and for transmitting it through said auxiliary system to another of said epicyclic gearing arrangements to cause said output shaft to rotate through another speed range; and means for extracting power from said input shaft and for transmitting said extracted power through said auxiliary system to one of said epicyclic gearing arrangements independently of said one epicyclic gearing arrangement.

21. A variable-speed transmission comprising in combination, an input shaft adapted to be rotated and to be subjected to an input torque; an output shaft adapted steplessly to be rotated over a speed range from zero to speeds in excess of that of said input shaft; plural paths of power flow between said input and output shafts; epicyclic arrangements having movable reactors in each of said power paths; means adapted to extract power from one of said epicyclic arrangements and for returning it to said transmission at the output side of said epicyclic arrangement independently of said other epicyclic gearing arrangement; means for supplying power to said one epicyclic arrangement which power is extracted from said other epicyclic arrangement to cause said output shaft to rotate through another speed range; and means for supplying power to said other epicyclic arrangement which latter power is extracted from said input shaft to cause said output shaft to rotate through still another speed range.

22. In a variable-speed transmission, an input shaft adapted to be rotated; an output shaft adapted to be rotated at steplessly variable speeds over a range from zero to speeds in excess of that of said input shaft; plural power paths between said input and output shafts; epicyclic arrangements in each of said paths, each having rotatable reactors; and means for steplessly varying the torque on, and the speed of the reactors of said epicyclic arrangements to produce the entire speed range of said output shaft, comprising means for extracting power from said transmission at one point; means adapted to return said extracted power to said transmission at another point; and means for preventing the return of any of said extracted power to said transmission at a point further removed from said output shaft than the point from which said power was extracted.

References Cited in the file of this patent

UNITED STATES PATENTS

| | | |
|---|---|---|
| 2,173,855 | Orshansky | Sept. 26, 1939 |
| 2,218,405 | Orshansky | Oct. 15, 1940 |
| 2,384,776 | Trofimov | Sept. 11, 1945 |
| 2,438,686 | Stone | Mar. 30, 1948 |
| 2,477,451 | Guins | July 26, 1949 |
| 2,498,821 | Olsson | Feb. 28, 1950 |
| 2,504,040 | Orshansky | Apr. 11, 1950 |
| 2,517,879 | Howard | Aug. 8, 1950 |
| 2,521,771 | Bechle | Sept. 12, 1950 |
| 2,580,946 | Orshansky et al. | Jan. 1, 1952 |
| 2,583,656 | Lay | Jan. 29, 1952 |
| 2,618,988 | Woydt | Nov. 25, 1952 |
| 2,647,417 | Trofimov | Aug. 4, 1953 |
| 2,648,502 | Trofimov | Aug. 11, 1953 |

FOREIGN PATENTS

| | | |
|---|---|---|
| 820,695 | Germany | Nov. 12, 1951 |

UNITED STATES PATENT OFFICE
CERTIFICATE OF CORRECTION

Patent No. 2,808,737

October 8, 1957

Edward P. Bullard III

It is hereby certified that error appears in the printed specification of the above numbered patent requiring correction and that the said Letters Patent should read as corrected below.

Column 9, line 47, for "rotation" read --rotating--; column 13, line 22, and column 19, line 8, after "gearing" and before the semi-colon, each occurrence, insert --to produce a range of speed of said output shaft--; column 14, line 45, after "means" insert --within said system--; column 16, lines 42 and 43 and line 64, column 17, line 39, and column 19, line 29, after "arrangement" and before the semi-colon, each occurrence, insert --to produce a range of speed of said output shaft--; column 16, lines 50 and 72, and column 19, line 17, after "arrangement" and before the period, each occurrence, insert --to cause said output shaft to rotate through still another speed range--; column 18, line 4, for "to any" read --of any--; column 19, line 34, before "which" insert --independently of said one epicyclic gearing arrangement--.

Signed and sealed this 31st day of December 1957.

(SEAL)
Attest:
KARL H. AXLINE
Attesting Officer

ROBERT C. WATSON
Commissioner of Patents